United States Patent
Twelves, Jr. et al.

(10) Patent No.: US 10,330,167 B2
(45) Date of Patent: Jun. 25, 2019

(54) DAMPER FOR MACHINING PROCESSES

(71) Applicant: United Technologies Corporation, Farmington, CT (US)

(72) Inventors: Wendell V. Twelves, Jr., Glastonbury, CT (US); Krzysztof Barnat, Berlin, CT (US)

(73) Assignee: United Technologies Corporation, Farmington, CT (US)

( * ) Notice: Subject to any disclaimer, the term of this patent is extended or adjusted under 35 U.S.C. 154(b) by 125 days.

(21) Appl. No.: 15/341,596

(22) Filed: Nov. 2, 2016

(65) Prior Publication Data
US 2018/0119766 A1    May 3, 2018

(51) Int. Cl.
| | | |
|---|---|---|
| B23Q 11/00 | (2006.01) | |
| F16F 7/00 | (2006.01) | |
| F16F 7/10 | (2006.01) | |
| B23C 3/00 | (2006.01) | |
| B23Q 3/06 | (2006.01) | |
| F16F 1/373 | (2006.01) | |

(52) U.S. Cl.
CPC .............. *F16F 7/10* (2013.01); *B23C 3/00* (2013.01); *B23Q 3/065* (2013.01); *B23Q 11/0032* (2013.01); *F16F 1/3737* (2013.01); *F16F 7/1034* (2013.01); *B23C 2215/04* (2013.01); *B23C 2215/44* (2013.01); *B23C 2220/605* (2013.01); *B23C 2250/16* (2013.01); *F16F 2224/02* (2013.01); *F16F 2224/0208* (2013.01); *F16F 2224/04* (2013.01)

(58) Field of Classification Search
CPC ......... B23C 9/00; B23C 1/06; B23C 2215/04; B23C 2215/44; B23C 2220/605; B23C 2250/16; B23C 3/00; B23Q 11/0032; B23Q 3/065; B23Q 1/00; F16F 1/3737; F16F 7/00
USPC ............... 409/235, 238, 141; 408/143, 234; 188/378; 267/137, 140.5, 140.11, 141; 29/27 C; 248/636, 638, 562; 82/149, 82/163
See application file for complete search history.

(56) References Cited

U.S. PATENT DOCUMENTS

| | | | | |
|---|---|---|---|---|
| 2,776,101 A | * | 1/1957 | McDermott | .............. F16F 1/36 248/633 |
| 3,690,414 A | | 9/1972 | Aggarwal et al. | |

(Continued)

FOREIGN PATENT DOCUMENTS

| | | |
|---|---|---|
| DE | 10330528 A1 | 2/2005 |
| EP | 2926941 A1 * 10/2015 | ......... B23K 37/0461 |

(Continued)

OTHER PUBLICATIONS

Extended European Search Report for European Patent Application No. 17199768.7, dated Apr. 12, 2018, 5 pages.

*Primary Examiner* — Nicole N Ramos
(74) *Attorney, Agent, or Firm* — Kinney & Lange, P.A.

(57) ABSTRACT

A damper includes a damper body that is configured to be attached to a workpiece during a machining process. A first side of the damper body is configured to abut a first side of the workpiece. The damper body includes a frame forming an outer periphery of the damper body, a plurality of damper nodes with a cavity in each damper node positioned in the frame, and a plurality of ribs extending between the frame and the damper nodes. A damping material is positioned in the cavity of each damper node.

20 Claims, 6 Drawing Sheets

(56) References Cited

U.S. PATENT DOCUMENTS

| | | | |
|---|---|---|---|
| 4,323,145 A | | 4/1982 | Allen |
| 4,803,112 A | * | 2/1989 | Kakimoto ................. B32B 3/30 |
| | | | 428/161 |
| 5,330,165 A | * | 7/1994 | van Goubergen ...... F16F 1/374 |
| | | | 248/633 |
| 5,538,373 A | | 7/1996 | Kirkham |
| 5,706,249 A | * | 1/1998 | Cushman ................. F16F 15/02 |
| | | | 181/284 |
| 5,765,818 A | * | 6/1998 | Sabatino ............ B23Q 11/0032 |
| | | | 188/268 |
| 6,382,603 B1 | * | 5/2002 | Monson .................. F16F 1/376 |
| | | | 248/562 |
| 7,125,211 B2 | | 10/2006 | Zoran |
| 7,681,869 B2 | | 3/2010 | Digernes |
| 2002/0070584 A1 | | 6/2002 | Carroll, III et al. |
| 2010/0122880 A1 | * | 5/2010 | Hanna ................. F16D 65/0006 |
| | | | 188/18 A |
| 2012/0207562 A1 | * | 8/2012 | Piggott .................. B23B 39/06 |
| | | | 409/219 |
| 2015/0231706 A1 | * | 8/2015 | Frank .................... B23B 29/022 |
| | | | 407/32 |

FOREIGN PATENT DOCUMENTS

| | | | |
|---|---|---|---|
| EP | 3050670 | A1 | 8/2016 |
| FR | 2519276 | A1 | 7/1983 |

* cited by examiner

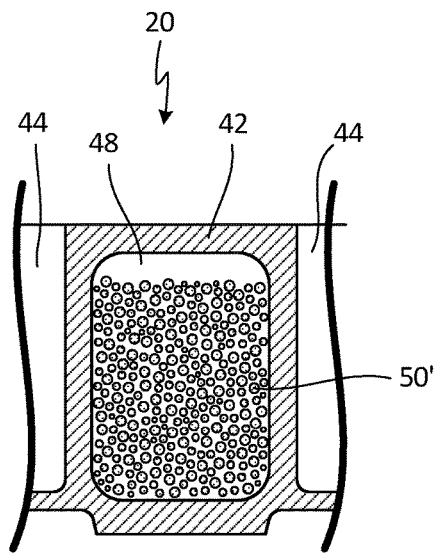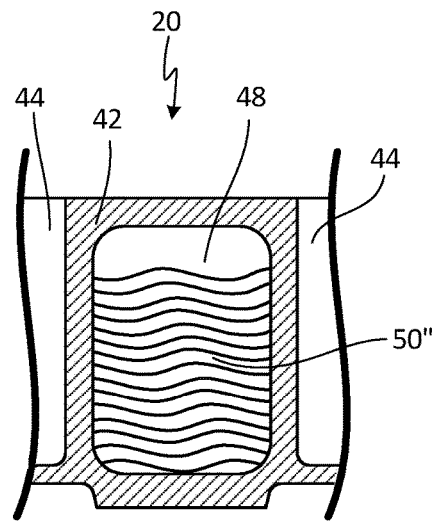
Fig. 2AFig. 2B
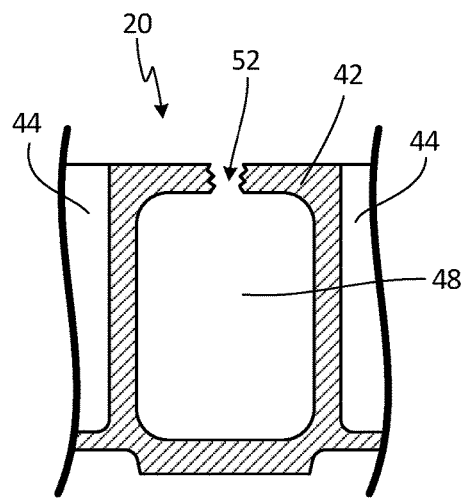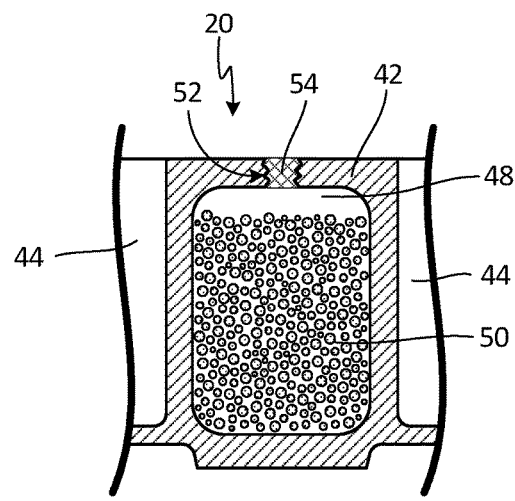
Fig. 3AFig. 3B

DAMPER FOR MACHINING PROCESSES

BACKGROUND

The present invention relates to dampers, and in particular, to a damper for machining operations.

Machining processes include a wide variety of manufacturing processes that are used to form a workpiece from raw material. An example of a machining process includes a milling process. Milling processes move a cutting tool across a workpiece to remove material from the workpiece.

Workpieces that are thin and have a high aspect ratio can be subject to chattering during machining processes due to their inherent flexibility. Chattering is rapid vibrations caused by machining processes. In milling processes, specifically, the interrupted cutting action of the cutting tool causes the chattering in the workpiece. Chattering produces waviness on the machined surface, a poor surface finish, and profile errors in the workpiece. Chattering can also result in delamination of composite workpieces.

Dampers can be used to dampen chattering during machining processes. Numerous damping solutions that exist face challenges. A first damping solution is to create a flexible damping sheet to support the workpiece, however flexible damping sheets are typically only effective over a narrow range of frequencies. This limits the speed at which the cutting tool can be turned and restricts the flutes on the cutting tool to avoid reaching frequencies outside of the range covered by the flexible damping sheet. A second damping solution is to use an elastomeric damper that can be attached to a workpiece, however the effectiveness of elastomeric dampers decreases as they age and can vary with temperature changes. A third damping solution is to fabricate complex fixtures to support and hold workpieces, however custom, complex fixtures can be expensive to produce. Further, once a complex fixture has been made, it can be time consuming and costly to adapt the fixture to accommodate design changes in the workpiece. A need exists for a simple workpiece damper that can dampen a broad spectrum of frequencies, is easy to install on and remove from a workpiece, has a low cost to manufacture, and can be easily adapted to accommodate design changes in the workpiece.

SUMMARY

A damper includes a damper body that is configured to be attached to a workpiece during a machining process. A first side of the damper body is configured to abut a first side of the workpiece. The damper body includes a frame forming an outer periphery of the damper body, a plurality of damper nodes with a cavity in each damper node positioned in the frame, and a plurality of ribs extending between the frame and the damper nodes. A damping material is positioned in the cavity of each damper node.

A machining system includes a machine having a first clamp, a second clamp, and a cutting tool. A workpiece is positioned in the machine. A first end of the workpiece is held in the first clamp of the machine and a second end of the workpiece is held in the second clamp of the machine. A damper is attached to the workpiece. The damper includes a damper body with a first surface that abuts against and conforms to the workpiece. The damper body has a frame forming an outer periphery of the damper body, a plurality of damper nodes with a cavity in each of the damper nodes, and a plurality of ribs extending from the frame to the damper nodes. A damping material is positioned in the cavity of each damper node.

A method of machining a workpiece includes positioning a workpiece in a machine. The workpiece is rough machined. A damper is attached to the workpiece. The damper has a damper body with a first surface that abuts against and conforms to the workpiece. The damper body has a frame forming an outer periphery of the damper body, a plurality of damper nodes with a cavity in each of the damper nodes, and a plurality of ribs extending from the frame to the damper nodes. The workpiece is finish machined. Vibrations in the workpiece are dampened with a damping material in the damper nodes of the damper.

BRIEF DESCRIPTION OF THE DRAWINGS

FIG. 2A is a cross-sectional view of a cavity in a damper node of the first embodiment of the damper with a particle damping material.

FIG. 2B is a cross-sectional view of the cavity in the damper node of the first embodiment of the damper with a liquid damping material.

FIG. 3A is a cross-sectional view of the cavity in the damper node shown in FIG. 2A with an aperture.

FIG. 3B is a cross-sectional view of the cavity in the damper node shown in FIG. 3A with a plug in the aperture.

DETAILED DESCRIPTION

Disclosed is a damper that can be attached to a workpiece during machining processes to dampen vibrations associated with the machining processes. The damper can be manufactured using an additive manufacturing process or a three-dimensional (3D) printing process, which allows the damper to be easily and quickly manufactured. Further, the damper can be designed to accommodate a particular workpiece and easily modified if the design of the workpiece is changed. The damper includes damper nodes that have cavities that are filled with a damping material to dampen vibrations from the machining process. The damping material in the damper can be a particle damping material or a liquid damping material. The type, size, shape, and volume of damping material that is used can be specifically selected to accommodate each particular workpiece.

Figure 1A:
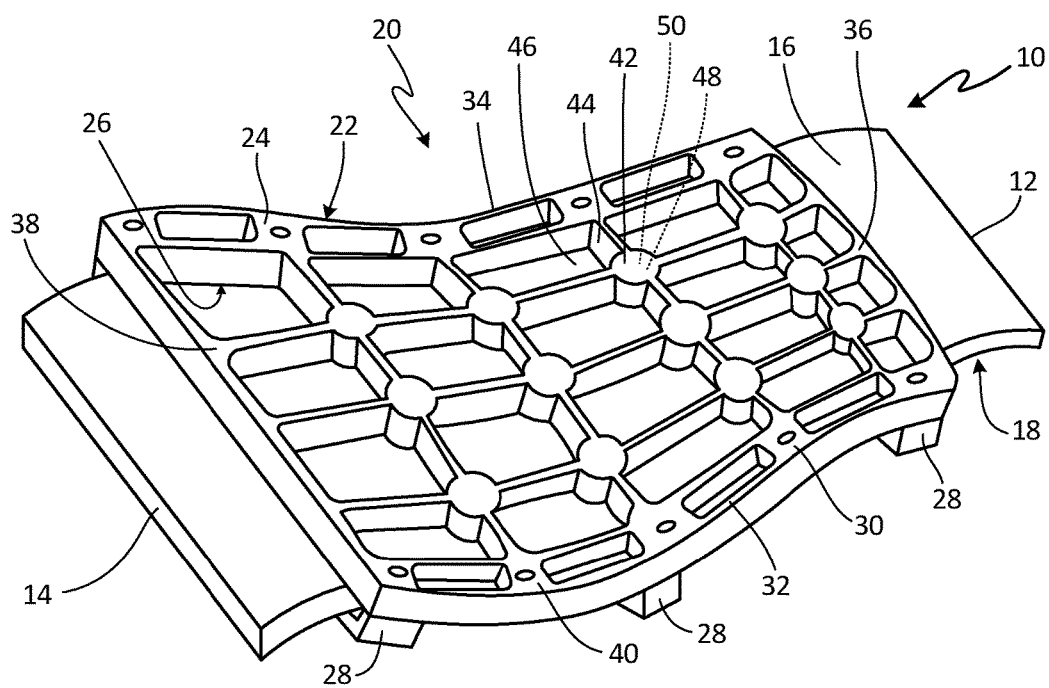
FIG. 1A is a perspective view of a first side of a first embodiment of a damper attached to an airfoil.
Figure 1B:
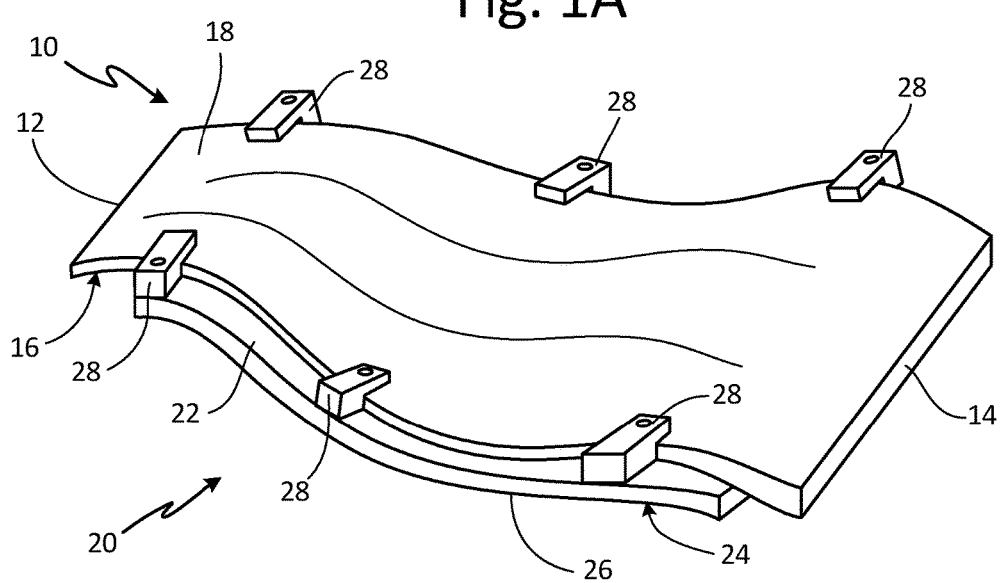
FIG. 1B is a perspective view of a second side of the first embodiment of the damper attached to the airfoil shown in FIG. 1A.

FIGS. 1A-1B show damper 20 attached to airfoil 10. FIG. 1A is a perspective view of a first side of damper 20 attached to airfoil 10. FIG. 1B is a perspective view of a second side of damper 20 attached to airfoil 10. Airfoil 10 includes tip 12, root 14, first surface 16, and second surface 18. Damper 20 includes body 22, first surface 24, second surface 26, attachment mechanisms 28, frame 30, first side 32, second side 34, third side 36, fourth side 38, attachment nodes 40, damper nodes 42, ribs 44, openings 46, cavities 48, and damping material 50.

Airfoil 10 has tip 12 at a first end and root 14 at a second end. First surface 16 of airfoil 10 extends from root 14 to tip 12. Second surface 18 of airfoil 10 is opposite of first surface 16 of airfoil 10 and extends from root 14 to tip 12. Airfoil 10 is a workpiece that is to be machined in the embodiment shown in FIGS. 1A-1B. Airfoil 10 can be made out of aluminum and can be between 2 feet (60.96 centimeters) and 3 feet (91.44 centimeters) long. In alternate embodiments, airfoil 10 can be any workpiece that needs machining. For instance, the workpiece can be thin ribs, bulkheads, fluid tank walls, case walls, brackets, hollow struts, manifolds, or additively manufacturing grown reduced density lattice cores for structural beams and panels.

Damper 20 is attached to airfoil 10. Damper 20 includes body 22 that forms a main portion of damper 20. Body 22 includes first surface 24 and second surface 26. First surface 24 of damper 20 faces away from airfoil 10, and second surface 26 of damper 20 faces and abuts first surface 16 of airfoil 10. Body 22 of damper 20 can be made out of a polymer, metallic, or composite material. In a preferred embodiment, body 22 of damper 20 is made out of an abrasion resistant polymer, such as nylon or polyurethane. Further, the abrasion resistant polymer may be filled with a reinforcing material.

Damper 20 further includes attachment mechanisms 28 that fasten to body 22 of damper 20 to attach damper 20 to airfoil 10. Attachment mechanisms 28 can include mechanical, adhesive, magnetic, pneumatic, hydraulic, or any other suitable means for attaching damper 20 to airfoil 10. Preferably, quick release clamps, such as toggle clamps or swing arm clamps, are used. Attachment mechanisms 28 can be shifted along airfoil 10 to allow machining of the entirety of second surface 18 of airfoil 10.

Frame 30 forms an outer periphery of body 22 of damper 20. Frame 30 has first side 32, second side 34, third side 36, and fourth side 38. First side 32 and second side 34 are opposite one another and third side 36 and fourth side 38 are opposite one another. First side 32 and second side 34 extend along airfoil 10 from root 14 to tip 12. Third side 36 extends from first side 32 to second side 34 adjacent to tip 12. Fourth side 38 extends from first side 32 to second side 34 adjacent to root 14.

Damper 20 further includes attachment nodes 40 and damper nodes 42 positioned within frame 30. Attachment nodes 40 are positioned along first side 32 and second side 34 of frame 30. Damper nodes 42 are positioned in a grid pattern in frame 30. Attachment nodes 40 and damper nodes 42 are connected to one another and to frame 30 with ribs 44. Ribs 44 extend from first side 32, second side 34, third side 36, and fourth side 38 to attachment nodes 40 and damper nodes 42 and between attachment nodes 40 and damper nodes 42. Ribs 44 are designed to transfer loads to damper nodes 42.

Attachment nodes 40 are positioned along first side 32 and second side 34 of frame 30. Attachment mechanisms 28 are attached to attachment nodes 40 to attach damper 20 to airfoil 10. Damper nodes 42 each have one of cavities 48 formed in them. Cavities 48 can be of any suitable shape, size, and orientation. In a preferred embodiment, cavities 48 have approximately twice the thickness as airfoil 10. Cavities 48 are filled with damping material 50. Damping material 50 can be a particle damping material or a liquid damping material.

Damper 20 is attached to airfoil 10 so that first surface 16 of airfoil 10 abuts second surface 26 of damper 20. This leaves second surface 18 of airfoil 10 exposed so that it can be machined. Airfoil 10 with damper 20 can be placed in a machining apparatus and machined with any suitable machining process. As airfoil 10 is machined, vibrations caused by the machining will be transferred from airfoil 10 to damper 20. Airfoil 10 is a very flexible workpiece and can be subject to significant vibrations during machining processes. Vibrations in damper 20 will move from frame 30 and ribs 44 to damper nodes 42. Damping material 50 in damper nodes 42 dissipates the vibrations to reduce the vibrations in airfoil 10 caused by the machining process.

Damper 20 dissipates the vibrations in airfoil 10 during the machining process to better control the machining process. Having better control over the machining process means that airfoil 10 will have an improved surface finish and a controlled profile. When damper 20 is attached to airfoil 10, airfoil 10 can be machined faster to reduce overall production costs associated with manufacturing airfoil 10. Further, damper 20 can be easily attached to and detached from airfoil 10 using attachment mechanisms 28. The ease of use of attachment mechanisms 28 also allows damper 20 to be repositioned as needed on airfoil 10 during a machining process.

Damper 20 can effectively dampen a wide range of frequencies by the selection of the material that forms damper body 22, by selection of the number of damper nodes 42 included in damper 20, by selection of the size and shape of cavities 48 in damper nodes 42, and the selection and volume of damping material 50 that is positioned in cavities 48 of damper nodes 42. Being effective across a wide range of frequencies allows damper 20 to be used in a wide range of applications.

Damper 20 can be custom designed to dampen airfoil 10 or any other workpiece. Damper 20 can be manufactured with an additive manufacturing process or a three-dimensional (3D) printing process, which allows a single damper 20 or a plurality of dampers 20 to be manufactured as needed. Further, additive manufacturing processes and three-dimensional (3D) printing processes only need short lead times in which to manufacture a part. A computer-aided drafting (CAD) model representing the design of damper 20 is used to manufacture damper 20 when using additive manufacturing processes or three-dimensional (3D) printing processes. If modifications are made to the design of airfoil 10, the computer-aided drafting (CAD) model of damper 20 can be likewise modified and damper 20 can be quickly printed to accommodate the design changes of airfoil 10. Further, using an additive manufacturing process or a three-dimensional (3D) printing process to manufacture damper 20 is less costly than other manufacturing methods.

FIGS. 2A-2B show cavity 48 in damper node 42 of damper 20. FIG. 2A is a cross-sectional view of cavity 48 in damper node 42 of damper 20 with particle damping material 50'. FIG. 2B is a cross-sectional view of cavity 48 in damper node 42 of damper 20 with liquid damping material 50". Damper 20 includes damper node 42, ribs 44, and cavity 48. FIG. 2A includes particle damping material 50'. FIG. 2B includes liquid damping material 50".

As shown in FIGS. 1A-1B, damper 20 includes a plurality of damper nodes 42 that are held in damper 20 with ribs 44. A single damper node 42 is shown in FIGS. 2A-2B, however the following applies to every damper node 42 in damper 20. Cavity 48 is formed in damper node 42. Cavity 48 is filled with a damping material.

In FIG. 2A, cavity 48 is filled with particle damping material 50'. Particle damping material 50' includes a plurality of particles of select size, shape, and density. Particle damping material 50' can be particles of steel, lead, tungsten carbide, or any other suitable material. The particle spheres of particle damping material 50' can preferable be between 0.030 inches (0.762 millimeters) and 0.125 inches (3.175 millimeters).

Damping takes place in damper 20 shown in FIG. 2A primarily by momentum exchange in the collision between particle damping material 50' and the walls of cavity 48. The energy from vibrations reaching damper node 42 are dissipated when the particle spheres of particle damping material 50' collide against the walls of cavity 48. Particle damping material 50' does not fill the entirety of cavity 48 to allow the particle spheres room to move within cavity 48. The volume of cavity 48 that is filled can vary depending on specific applications. To dampen low frequencies, approximately 15% to 20% of cavity 48 can be left open. To dampen high frequencies, approximately 5% or less of cavity 48 can be left open.

Inelastic collisions between the particles of particle damping material 50', friction, and heat conversion also contribute to damping taking place in damper 20 with particle damping material 50'. Particle damping material 50' allows damper 20 to act as a Particle Impact Damper (PID). The size, shape, and density of the particles in the PID and the amount of the particles in the PID can be specifically selected based on the given application, making the PID effective for use in many applications. PIDs also perform well under a wide range of temperatures and frequencies and have a long life.

In FIG. 2B, cavity 48 is filled with liquid damping material 50". Liquid damping material 50" can be a high density liquid metal, a high density liquid slurry, or any other suitable liquid. An example of a high density liquid metal that can be used includes liquid mercury. Liquid mercury provides good damping due to its high density. The energy from vibrations that reach damper node 42 are dissipated as the energy is used to move liquid damping material 50". Liquid damping material 50" does not fill cavity 48 to allow room for liquid damping material 50" to move within cavity 48. The liquid damping material 50" is free to move in any direction in cavity 48, allowing it to dissipate any vibrations that reach damper node 42.

Particle damping material 50' and liquid damping material 50" can both be used in damper 20 to dampen vibrations from machining processes. Both particle damping material 50' and liquid damping material 50" can be custom picked to suit different applications. This allows damper 20 to be custom designed to be highly effective in each application.

FIGS. 3A-3B show cavity 48 in damper node 42 of damper 20. FIG. 3A is a cross-sectional view of cavity 48 in damper node 42 with aperture 52. FIG. 3B is a cross-sectional view of cavity 48 in damper node 42 with plug 54 in aperture 52. Damper 20 includes damper node 42, ribs 44, cavity 48, damping material 50, aperture 52, and plug 54.

As shown in FIGS. 1A-1B, damper 20 includes a plurality of damper nodes 42 that are held in damper 20 with ribs 44. A single damper node 42 is shown in FIGS. 3A-3B, however the following applies to every damper node 42 in damper 20. Cavity 48 is formed in damper node 42. Cavity 48 is filled with damping material 50. Aperture 52 is formed in damper node 42 to provide access to cavity 48, as shown in FIG. 3A. Plug 54 is placed in aperture 52 to seal cavity 48, as shown in FIG. 3B.

Damper 20 can be manufactured with any suitable manufacturing process, including additive manufacturing or a three-dimensional (3D) printing process. Aperture 52 can be formed in damper node 42 when damper 20 is manufactured. Damper 20 can also be manufactured and then aperture 52 can be formed in damper node 42 after damper 20 has been manufactured. Aperture 52 provides access to cavity 48 in damper node 42. If material is left in cavity 48 of damper node 42 after damper 20 is manufactured, aperture 52 allows the material to be removed from cavity 48. For instance, if damper 20 is manufactured with an additive manufacturing process there will be loose powder in cavity 48 of damper node 42. The loose powder in cavity 48 of damper node 42 can be removed through aperture 52.

After any material left in cavity 48 from manufacturing is removed from cavity 48 through aperture 52, damping material 50 can be placed in cavity 48 through aperture 52. The damping material 50 can be a particle damping material or a liquid damping material. After damping material 50 has been placed in cavity 48 of damper node 42, plug 54 can be positioned in aperture 52 to seal cavity 48. Plug 54 can connect to aperture 52 in a number of ways. Aperture 52 and plug 54 are show with threads in FIGS. 3A-3B, allowing plug 54 to be screwed into place in aperture 52. In alternate embodiments, plug 54 can be bonded, heat sealed, or otherwise sealed into aperture 52.

Aperture 52 and plug 54 allow damper 20 to be manufactured without damping material 50 needing to be placed in cavity 48 during the manufacturing. This allows damper 20 to be later filled with damping material 50 and then tested. If it is found that more or less or a different damping material 50 would provide better damping results, plug 54 can be removed from aperture 52 of damper 20 to provide access to cavity 48. After damping material 50 has been modified, plug 54 can be resealed in aperture 52. This allows great flexibility in the design of damper 20, as damper 20 can be modified based on the results of testing without having to redesign the entirety of damper 20. This ensures that damper 20 has high damping ability for each specific application.

Figure 4A:
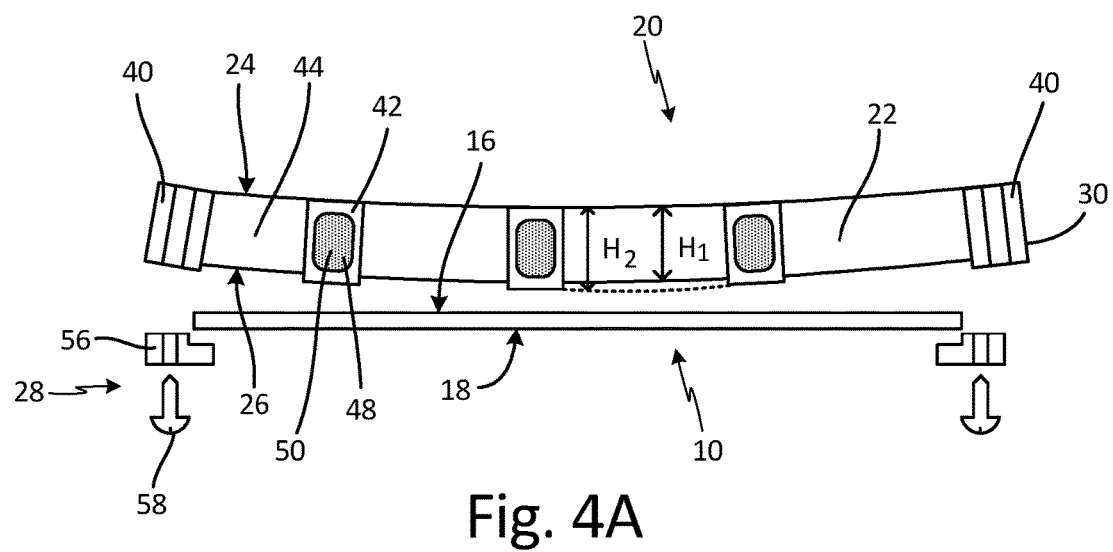
FIG. 4A is a side cross-sectional view of the first embodiment of the damper before it is attached to the airfoil.
Figure 4B:
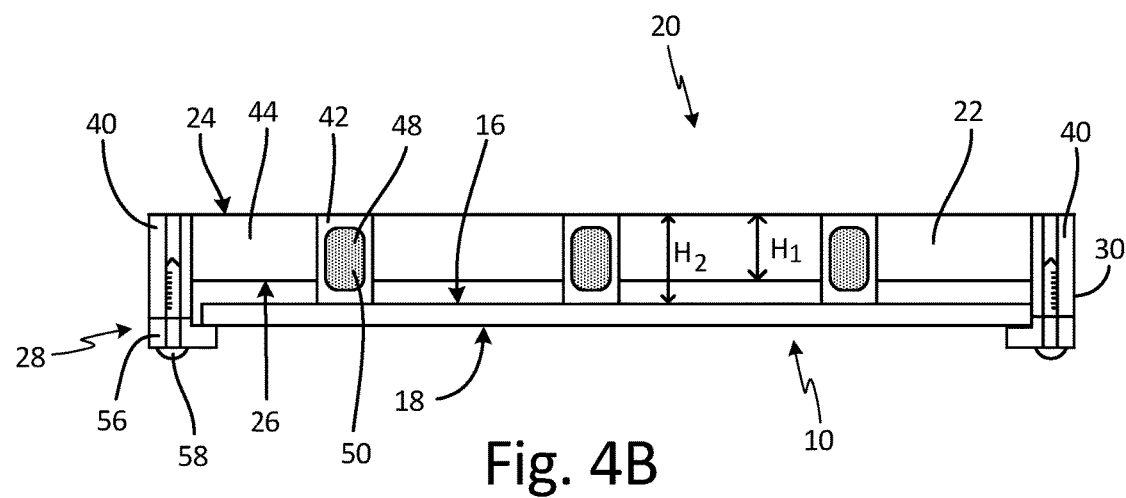
FIG. 4B is a side cross-sectional view of the first embodiment of the damper after it is attached to the airfoil.

FIGS. 4A-4B show damper 20 being attached to airfoil 10. FIG. 4A is a side cross-sectional view of damper 20 before it is attached to airfoil 10. FIG. 4B is a side cross-sectional view of damper 20 after it is attached to airfoil 10. Airfoil 10 includes first surface 16 and second surface 18. Damper 20 includes body 22, first surface 24, second surface 26, attachment mechanisms 28, frame 30, attachment nodes 40, damper nodes 42, ribs 44, cavities 48, and damping material 50. Attachment mechanisms 28 include clamp tabs 56 and bolts 58. Also shown in FIGS. 4A-4B are rib height $H_1$ and damper node height $H_2$.

Airfoil 10 has first surface 16 and second surface 18. First surface 16 faces and abuts damper 20 and second surface 18 faces away from damper 20. Second surface 18 can be machined when damper 20 is attached to airfoil 10.

Damper 20 includes body 22 that forms a main body portion of damper 20. Body 22 has first surface 24 that faces away from airfoil 10 and second surface 26 that faces and abuts first surface 16 of airfoil 10. Damper 20 also includes attachment mechanisms 28 that fasten to body 22 of damper 20 to attach damper 20 to airfoil 10.

Frame 30 forms an outer periphery of body 22 of damper 20. Attachment nodes 40 and damper nodes 42 are positioned within frame 30. Ribs 44 extend from frame 30 to attachment nodes 40 and damper nodes 42 and between attachment nodes 40 and damper nodes 42. Attachment mechanisms 28 are attached to attachment nodes 40 to attach damper 20 to airfoil 10. Damper nodes 42 each have one of cavities 48 formed in it. Cavities 48 are filled with damping material 50. Damping material 50 can be a particle material or a liquid material.

Ribs 44 have rib height $H_1$. Damper nodes 42 have damper node height $H_2$. As shown in FIGS. 4A-4B, damper node height $H_2$ is larger than rib height $H_1$. Ribs 44 and damper nodes 42 are flush with one another on first surface 24 of damper 20, but damper nodes 42 extend past ribs 44 on second surface 26 of damper 20. Damper node height $H_2$ is larger than rib height $H_1$ to allow damper nodes 42 to extend past ribs 44 on second surface 26 of damper 20. When damper 20 is attached to airfoil 10, damper nodes 42 will abut airfoil 10. As damper nodes 42 dissipate vibrations from airfoil 10, this ensures good contact between damper nodes 42 and airfoil 10.

As shown in FIG. 4A, before damper 20 is clamped to airfoil 10, it has a reverse curvature with respect to airfoil 10. As shown in FIG. 4B, when damper 20 is attached to airfoil 10, damper 20 is deformed so that it conforms to airfoil 10 and sits tightly against airfoil 10. The spring force created by conforming damper 20 to airfoil 10 ensures firm contact between damper nodes 42 of damper 20 and airfoil 10 when damper 20 is attached to airfoil 10.

Damper 20 is attached to airfoil 10 using attachment mechanisms 28. Attachment mechanisms 28 can include mechanical, adhesive, magnetic, pneumatic, hydraulic, or any other suitable means for attaching damper 20 to airfoil 10. In the embodiment shown in FIGS. 4A-4B, attachment mechanisms 28 include clamp tab 56 and bolt 58. Clamp tab 56 has a notch cut into it that fits against an edge of airfoil 10. The notch of clamp tab 56 sits in part against second surface 18 of airfoil 10. Clamp tab 56 also sits against one attachment node 40. Both clamp tab 56 and attachment node 40 have an aperture extending through them. Bolt 58 is placed in the aperture of clamp tab 56 and attachment node 40 and is used to connect clamp tab 56 to attachment node 40.

Not every attachment node 40 needs to be attached to one attachment mechanism 28 to attach damper 20 to airfoil 10. Rather, attachment mechanisms 28 can be shifted between attachment nodes 40. When attachment mechanisms 28 are attached to attachment nodes 40, a portion of attachment mechanisms 28 cover a portion of second surface 18 of airfoil 10. To allow access to an entirety of second surface 18 for machining, attachment mechanisms 28 can be moved between attachment nodes 40 to allow access to the previously covered sections of second surface 18 of airfoil 10.

The larger height of damper nodes 42, the reverse curvature of damper body 22, and the design of attachment mechanisms 28 all work together to form a firm contact between damper nodes 42 and airfoil 10. The firm contact between damper nodes 42 and airfoil 10 ensures that vibrations in airfoil 10 caused by machining processes are transferred to and dissipated in damper nodes 42.

Figure 5:
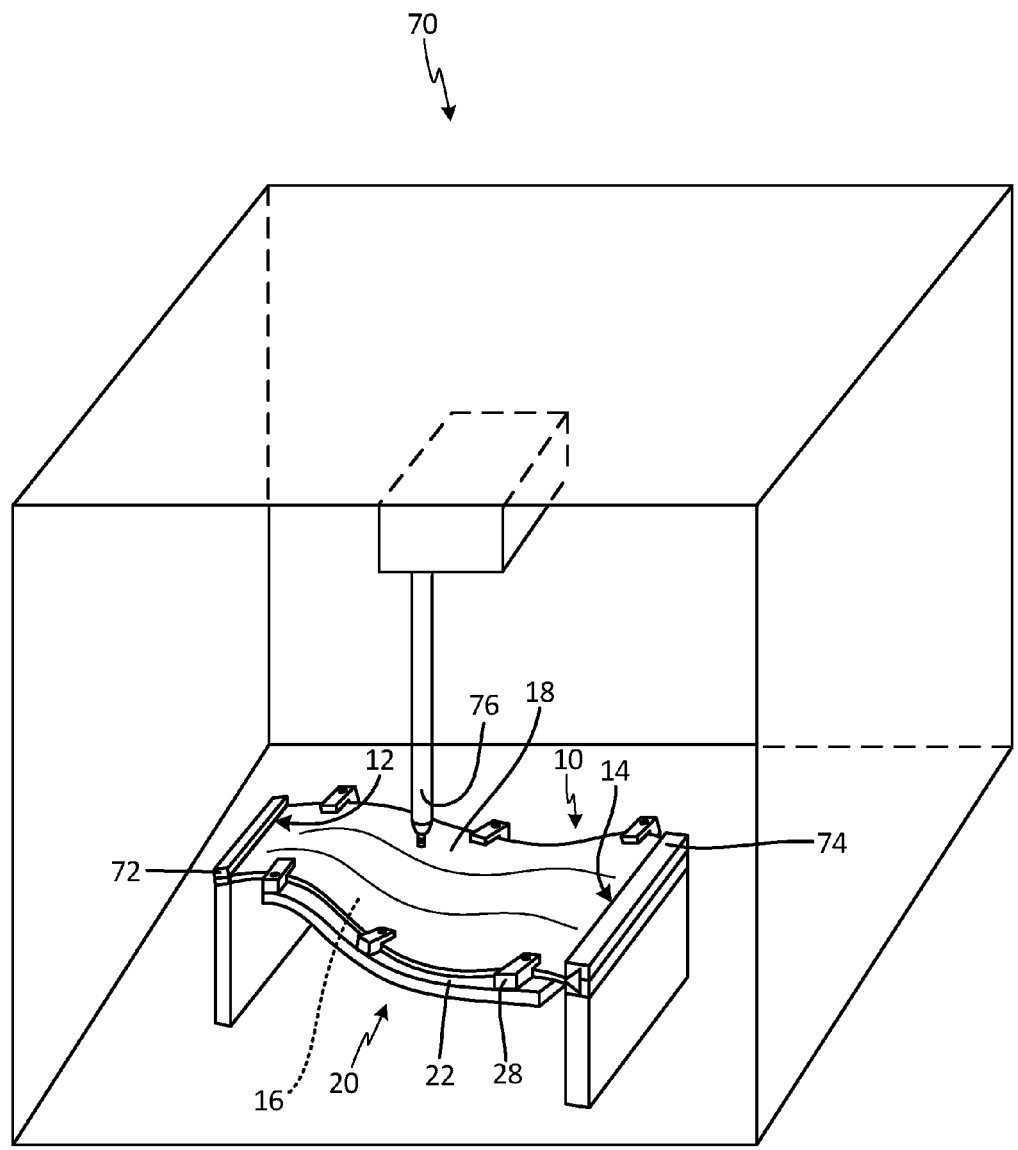
FIG. 5 is a perspective view of a machining apparatus that is machining the airfoil to which the first embodiment of the damper is attached.

FIG. 5 is a perspective view of machining apparatus 70 that is machining airfoil 10 to which damper 20 is attached. Airfoil 10 includes tip 12, root 14, first surface 16, and second surface 18. Damper 20 includes body 22 and attachment mechanisms 28. Machining apparatus 70 includes first clamp 72, second clamp 74, and cutting tool 76.

Airfoil 10 has tip 12 at a first end and root 14 at a second end. First surface 16 extends from root 14 to tip 12 and faces and abuts damper 20. Second surface 18 extends from root 14 to tip 12 and faces away from damper 20. Second surface 18 can be machined when damper 20 is attached to airfoil 10. Damper 20 includes body 22 that abuts first surface 16 of airfoil 10. Attachment mechanisms 28 attach body 22 of damper 20 to airfoil 10 and hold damper 20 in place on airfoil 10.

Machining apparatus 70 is a milling apparatus in the embodiment shown in FIG. 5. In alternate embodiments, machining apparatus 70 can be any suitable machining apparatus. Machining apparatus 70 includes first clamp 72 and second clamp 74 to support airfoil 10. First clamp 72 is attached to tip 12 of airfoil 10, and second clamp 74 is attached to root 14 of airfoil 10. In alternate embodiments, machining apparatus 70 can include any support structure to support any workpiece. Machining apparatus 70 further includes cutting tool 76. Cutting tool 76 moves throughout machining apparatus 70 to machine airfoil 10. In alternate embodiments, cutting tool 76 can move through machining apparatus 70 to machine any workpiece.

As cutting tool 76 moves across second surface 18 of airfoil 10, airfoil 10 will be subject to chattering. Chattering is rapid vibrations caused by machining processes. Damper 20 is attached to airfoil 10 to dissipate the vibrations in airfoil 10 caused by the movement of cutting tool 76 across second surface 18 of airfoil 10. Damper 20 dissipates the vibrations with the damping material 50 in damper nodes 42 (damping material 50 and damper nodes 42 not shown in FIG. 5).

Figure 6:
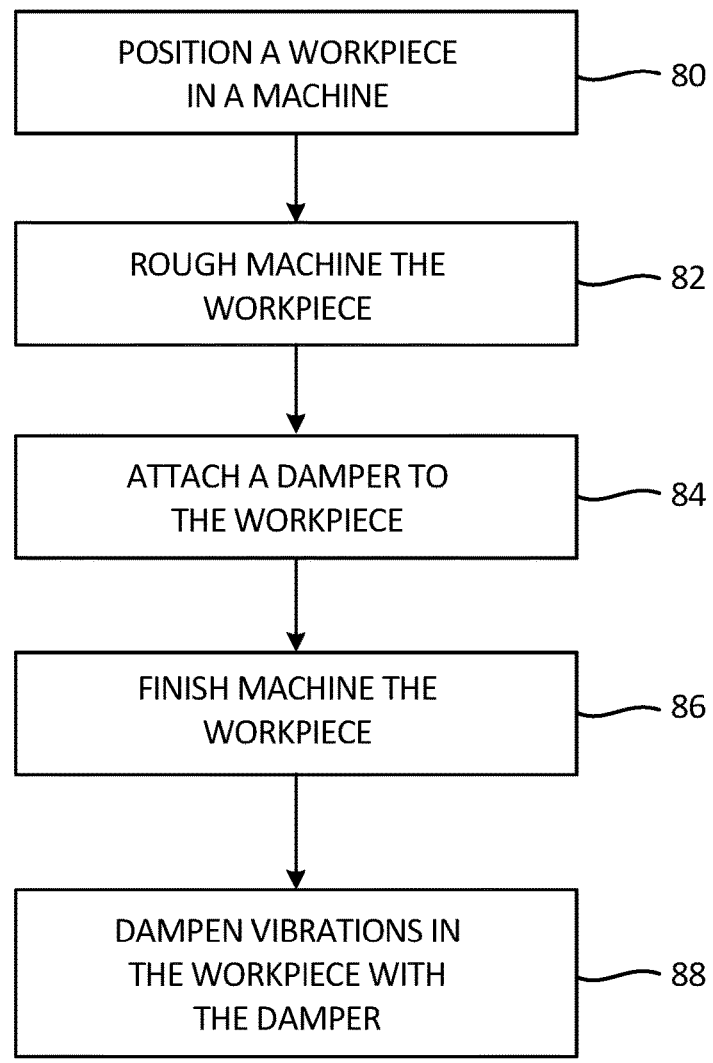
FIG. 6 is a flowchart showing a machining process that uses the first embodiment of the damper.

FIG. 6 is a flowchart showing a machining process that uses damper 20. FIG. 6 includes first step 80, second step 82, third step 84, fourth step 86, and fifth step 88.

First step 80 includes positioning a workpiece in a machining apparatus. In the embodiment discussed above in FIGS. 1A-5, airfoil 10 is positioned in machining apparatus 70. Tip 12 of airfoil 10 is attached to first clamp 72 of machining apparatus 70 and root 14 of airfoil 10 is attached to second clamp 74 of machining apparatus 70. In alternate embodiments, any workpiece can be positioned in any machining apparatus in any suitable manner.

Second step 82 includes rough machining the workpiece. In the embodiment discussed above in FIGS. 1A-5, cutting tool 76 of machining apparatus 70 moves across airfoil 10 to rough machine airfoil 10. In alternate embodiments, any cutting tool or machining tool can rough machine any workpiece. Rough machining includes a first round of machining to take the workpiece from a rough state to an intermediate state.

Third step 84 includes attaching damper 20 to the workpiece. In the embodiment discussed above in FIGS. 1A-5, damper 20 is attached to airfoil 10. Damper 20 is attached to airfoil 10 using attachment mechanisms 28. Attachment mechanisms 28 attach to attachment nodes 44 of damper 20. In alternate embodiments, damper 20 can be attached to any suitable workpiece in any suitable manner.

Fourth step 86 includes finish machining the workpiece. In the embodiment discussed above in FIGS. 1A-5, cutting tool 76 of machining apparatus 70 moves across airfoil 10 to finish machine airfoil 10. In alternate embodiments, any cutting tool or machining tool can finish machine any workpiece. Finish machining includes a second round of machining to take the workpiece from an intermediate state to a final state. Finish machining includes more controlled machining to achieve a specific surface finish on the workpiece. Finish machining can generate significant chattering in the workpiece.

Fifth step 88 includes dampening the vibrations from the chattering of the workpiece with damper 20. In the embodiment discussed above in FIGS. 1A-5, damper 20 dampens the vibrations in airfoil 10. In alternate embodiments, damper 20 can dampen vibrations in any workpiece.

Damper 20 dampens vibrations from the chattering of the workpiece by dissipating the vibrations in damper nodes 42. The vibrations move from frame 30 of damper 20 along ribs 44 to damper nodes 42. Damper nodes 42 contain damping material 50 in cavities 48. The vibrations are dissipated by moving damping material 50 in cavities 48. Damping material 50 can be a particle damping material that dissipates the vibrations due to the collision of the particles against the walls of cavities 48. Alternatively, damping material 50 can be a liquid damping material that dissipates the vibrations by using the energy from the vibrations to move the liquid damping material.

Figure 7:
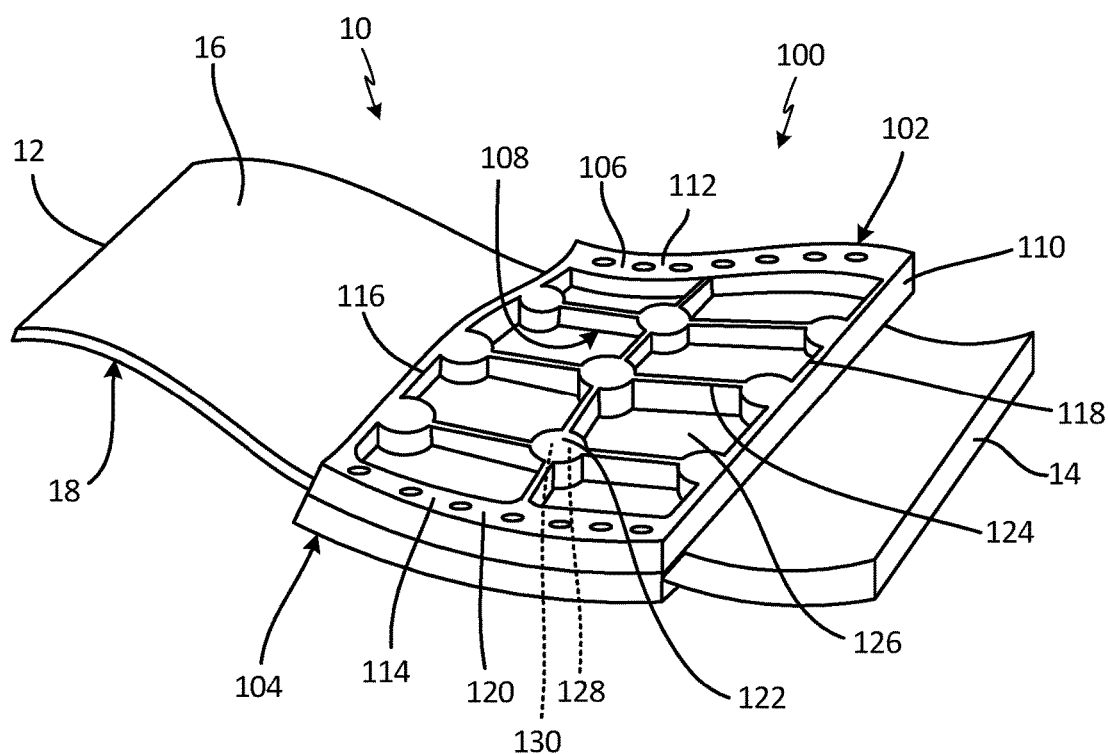
FIG. 7 is a perspective view of a first side of a second embodiment of a damper attached to an airfoil.

FIG. 7 is a perspective view of a first side of damper 100 attached to airfoil 10. Airfoil 10 includes tip 12, root 14, first surface 16, and second surface 18. Damper 100 includes first body portion 102 and second body portion 104. Both of first body portion 102 and second body portion 104 have first surface 106, second surface 108, frame 110, first side 112, second side 114, third side 116, fourth side 118, attachment nodes 120, damper nodes 122, ribs 124, openings 126, cavities 128, and damping material 130.

Airfoil 10 has tip 12 at a first end and root 14 at a second end. First surface 16 of airfoil 10 extends from root 14 to tip 12. Second surface 18 of airfoil 10 is opposite of first surface 16 of airfoil 10 and extends from root 14 to tip 12.

Damper 100 is attached to airfoil 10. Damper 100 includes first body portion 102 and second body portion 104. First body portion 102 and second body portion 104 can be made out of a polymer, metallic, or composite material. First body portion 102 and second body portion 104 mirror one another and have the same structure. First body portion 102 is shown in full in FIG. 7 and will be discussed in greater detail below. However, the discussion of first body portion 102 below also applies to second body portion 104.

First body portion 102 includes first surface 106 and second surface 108. First surface 106 of damper 100 faces away from airfoil 10, and second surface 108 of damper 100 faces and abuts first surface 16 of airfoil 10.

Frame 110 forms an outer periphery of first body portion 102 of damper 100. Frame 110 has first side 112, second side 114, third side 116, and fourth side 118. First side 112 and second side 114 are opposite one another and third side 116 and fourth side 118 are opposite one another. First side 112 and second side 114 extend in a spanwise direction along a portion of airfoil 10. Third side 116 and fourth side 118 extend from first side 112 to second side 114 across airfoil 10.

Damper 100 further includes attachment nodes 120 and damper nodes 122 positioned within frame 110. Attachment nodes 120 are positioned along first side 112 and second side 114 of frame 110. Damper nodes 122 are positioned along third side 116 and fourth side 114 and within frame 110 in a grid pattern. Attachment nodes 120 and damper nodes 122 are connected to one another and to frame 110 with ribs 124. Ribs 124 extend between attachment nodes 120 and damper nodes 122. Ribs 124 are design to transfer loads to damper nodes 122.

Attachment nodes 120 are positioned along first side 112 and second side 114 of frame 110. Attachment nodes 120 on first body portion 102 are aligned with and attached to attachment nodes 120 (not shown in FIG. 7) on second body portion 102 to attach damper 100 to airfoil 10. Damper nodes 122 each have one of cavities 128 formed in it. Cavities 128 can be of any suitable shape, size, and orientation. Cavities 128 are filled with damping material 130. Damping material 130 can be a particle material or a liquid material.

Damper 100 is attached to airfoil 10 so that second surface 108 of first body portion 102 abuts first surface 16 of airfoil 10 and so that second surface 108 (not shown in FIG. 7) of second body portion 104 abuts second surface 18 of airfoil 10. This leaves half of first surface 16 of airfoil 10 and half of second surface 18 of airfoil 10 exposed so that they can be machined. Airfoil 10 with damper 100 can be placed in a machining apparatus and machined with any suitable machining process. As airfoil 10 is machined, vibrations caused by the machining will be transferred from airfoil 10 to damper 100. Vibrations in damper 100 will move from frame 110 and ribs 124 to damper nodes 122. Damping material 130 in damper nodes 122 dissipate the vibrations to reduce the chattering of airfoil 10 caused by the machining process.

Discussion of Possible Embodiments

The following are non-exclusive descriptions of possible embodiments of the present invention.

A damper includes a damper body that is configured to be attached to a workpiece during a machining process. A first side of the damper body is configured to abut a first side of the workpiece. The damper body includes a frame forming an outer periphery of the damper body, a plurality of damper nodes with a cavity in each damper node positioned in the frame, and a plurality of ribs extending between the frame and the damper nodes. A damping material is positioned in the cavity of each damper node.

The damper of the preceding paragraph can optionally include, additionally and/or alternatively, any one or more of the following features, configurations and/or additional components:

The damper is manufactured using an additive manufacturing process or a three-dimensional printing process.

The damping material includes a plurality of particles.

The plurality of particles are selected from the group consisting of steel, lead, tungsten carbide, or combination thereof.

Each of the plurality of particles have a diameter of between 0.030 inches (0.762 millimeters) and 0.125 inches (3.175 millimeters).

The damping material is a high density liquid metal or a high density liquid slurry.

The damper body is made out of a material selected from the group consisting of an abrasion resistant polymer, a polymer, a metallic, a composite, or combinations thereof.

The ribs are configured to transfer loads to the damper nodes.

The plurality of damper nodes have a larger height than the ribs.

The damper includes an attachment mechanism that is configured to attach to attachment nodes on the damper body to attach the damper body to a workpiece.

The attachment mechanism is selected from the group consisting of a clamp, a bolt, an adhesive, a magnet, a pneumatic attachment, a hydraulic attachment, or combinations thereof.

The damper body extends along a first surface of a workpiece and is attached to a first edge and a second edge of the workpiece.

The damper body includes a first body portion extending along a first surface of a workpiece and a second body portion extending along a second surface of the workpiece, wherein the first body portion and the second body portion are attached to one another.

The damper body is curved.

A machining system includes a machine having a first clamp, a second clamp, and a cutting tool. A workpiece is positioned in the machine. A first end of the workpiece is held in the first clamp of the machine and a second end of the workpiece is held in the second clamp of the machine. A damper is attached to the workpiece. The damper includes a damper body with a first surface that abuts against and conforms to the workpiece. The damper body has a frame forming an outer periphery of the damper body, a plurality of damper nodes with a cavity in each of the damper nodes, and a plurality of ribs extending from the frame to the damper nodes. A damping material is positioned in the cavity of each damper node.

The machining system of the preceding paragraph can optionally include, additionally and/or alternatively, any one or more of the following features, configurations and/or additional components:

The damper body is twice as thick as the workpiece.

A method of machining a workpiece includes positioning a workpiece in a machine. The workpiece is rough machined. A damper is attached to the workpiece. The damper has a damper body with a first surface that abuts against and conforms to the workpiece. The damper body has a frame forming an outer periphery of the damper body, a plurality of damper nodes with a cavity in each of the damper nodes, and a plurality of ribs extending from the frame to the damper nodes. The workpiece is finish machined. Vibrations in the workpiece are dampened with a damping material in the damper nodes of the damper.

The method of the preceding paragraph can optionally include, additionally and/or alternatively, any one or more of the following features, configurations and/or additional components:

Positioning a workpiece in a machine includes clamping a first end of the workpiece in a first clamp in the machine, and clamping a second end of the workpiece in a second clamp in the machine.

The damping material in the damper nodes is selected from the group consisting of particles of steel, particles of lead, particles of tungsten carbide, liquid mercury, or combinations thereof.

Attaching a damper to the workpiece includes clamping the damper to the workpiece.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A damper comprising:
   a damper body that is configured to be attached to a workpiece during a machining process, wherein a first side of the damper body is configured to abut a first surface of the workpiece, and wherein the damper body further comprises:
   a frame forming an outer periphery of the damper body;
   a plurality of damper nodes with a cavity in each damper node positioned in the frame; and
   a plurality of ribs extending between the frame and the damper nodes; and
   a damping material positioned in the cavity of each damper node.

2. The damper of claim 1, wherein the damper is manufactured using an additive manufacturing process or a three-dimensional printing process.

3. The damper of claim 1, wherein the damping material includes a plurality of particles.

4. The damper of claim 3, wherein the plurality of particles are selected from the group consisting of steel, lead, tungsten carbide, or combination thereof.

5. The damper of claim 3, wherein each of the plurality of particles have a diameter of between 0.030 inches and 0.125 inches.

6. The damper of claim 1, wherein the damping material is a high density liquid metal or a high density liquid slurry.

7. The damper of claim 1, wherein the damper body is made out of a material selected from the group consisting of an abrasion resistant polymer, a polymer, a metallic, a composite, or combinations thereof.

8. The damper of claim 1, wherein the ribs are configured to transfer loads to the damper nodes.

9. The damper of claim 1, wherein the plurality of damper nodes have a larger height than the ribs.

10. The damper of claim 1, wherein the damper further comprises:
    an attachment mechanism that is configured to attach to attachment nodes on the damper body to attach the damper body to the workpiece.

11. The damper of claim 10, wherein the attachment mechanism is selected from the group consisting of a clamp, a bolt, an adhesive, a magnet, a pneumatic attachment, a hydraulic attachment, or combinations thereof.

12. The damper of claim 1, wherein the damper body extends along the first surface of the workpiece and is attached to a first edge and a second edge of the workpiece.

13. The damper of claim 1, wherein the damper body includes a first body portion extending along the first surface of the workpiece and a second body portion extending along a second surface of the workpiece, wherein the first body portion and the second body portion are attached to one another.

14. The damper of claim 1, wherein the damper body is curved.

15. A machining system comprising:
    a machine having a first clamp, a second clamp, and a cutting tool;
    a workpiece positioned in the machine, wherein a first end of the workpiece is held in the first clamp of the machine and a second end of the workpiece is held in the second clamp of the machine; and
    a damper attached to the workpiece, wherein the damper comprises:
    a damper body with a first surface that abuts against and conforms to the workpiece, wherein the damper body has a frame forming an outer periphery of the damper body, a plurality of damper nodes with a cavity in each of the damper nodes, and a plurality of ribs extending from the frame to the damper nodes; and
    a damping material positioned in the cavity of each damper node.

16. The machining system of claim 15, wherein the damper body is twice as thick as the workpiece.

17. A method of machining a workpiece comprises:
    positioning a workpiece in a machine;

rough machining the workpiece;
attaching a damper to the workpiece, wherein the damper has a damper body with a first surface that abuts against and conforms to the workpiece, wherein the damper body has a frame forming an outer periphery of the damper body, a plurality of damper nodes with a cavity in each of the damper nodes, and a plurality of ribs extending from the frame to the damper nodes;
finish machining the workpiece; and
damping vibrations in the workpiece with a damping material in the damper nodes of the damper.

18. The method of claim 17, wherein positioning the workpiece in the machine further comprises:
clamping a first end of the workpiece in a first clamp in the machine; and
clamping a second end of the workpiece in a second clamp in the machine.

19. The method of claim 17, wherein the damping material in the damper nodes is selected from the group consisting of particles of steel, particles of lead, particles of tungsten carbide, liquid mercury, or combinations thereof.

20. The method of claim 17, wherein attaching the damper to the workpiece further comprises clamping the damper to the workpiece.

* * * * *